United States Patent [19]

Nash et al.

[11] Patent Number: 4,840,026

[45] Date of Patent: Jun. 20, 1989

[54] BAND CLAMP APPARATUS

[75] Inventors: Dudley O. Nash, Cincinnati; Glenn L. Knight, Jr., Mason; James H. Bertke, Cincinnati, all of Ohio

[73] Assignee: The United States of America as represented by the Secretary of the Air Force, Washington, D.C.

[21] Appl. No.: 159,868

[22] Filed: Feb. 24, 1988

[51] Int. Cl.$^4$ .............................................. F02K 1/00
[52] U.S. Cl. ................................. 60/271; 60/39.32; 285/367; 285/330; 415/214.1; 415/142
[58] Field of Search ............... 60/39.31, 39.32, 261, 60/271; 285/367, 411, 330, 18; 415/219 R, 142

[56] References Cited

U.S. PATENT DOCUMENTS

| | | | |
|---|---|---|---|
| 2,720,079 | 10/1955 | Mines | 60/39.32 |
| 2,766,963 | 10/1956 | Zimmerman | 415/218 |
| 2,773,709 | 12/1956 | Smith | 285/187 |
| 2,837,087 | 5/1958 | Herman | 285/367 |
| 2,839,894 | 6/1958 | Shutts et al. | 60/39.31 |
| 2,849,960 | 9/1958 | Olmstead et al. | 285/363 |
| 2,878,041 | 3/1959 | Hobbs | 285/411 |
| 3,403,931 | 10/1968 | Crain et al. | 285/367 |
| 3,429,014 | 2/1969 | Roche | 285/367 |
| 3,556,568 | 1/1971 | King | 285/367 |
| 3,635,506 | 1/1972 | Womble et al. | 285/411 |
| 3,689,113 | 9/1972 | Blaschke | 285/330 |
| 3,903,693 | 9/1975 | Fox | 60/39.32 |
| 4,443,029 | 4/1984 | Laxo | 285/367 |
| 4,469,354 | 9/1984 | Caldwell | 285/367 |
| 4,480,436 | 11/1984 | Maclin | 60/39.32 |
| 4,512,596 | 4/1985 | Obrecht | 285/330 |
| 4,688,378 | 8/1987 | Harris | 60/39.32 |

FOREIGN PATENT DOCUMENTS 512333  4/1976  U.S.S.R. .................... 285/367

Primary Examiner—Louis J. Casaregola
Assistant Examiner—Timothy S. Thorpe
Attorney, Agent, or Firm—William Stepanishen; Donald J. Singer

[57] ABSTRACT

A band clamp apparatus having two 180° segments which are bolted together at flanges on the horizontal centerline. A substantial portion of each segment has a scalloped band contour for weight reduction. An internal groove in the band clamp which has parallel facing walls which engage the mated flanges of the casings of the engine/exhaust system. Local radial restraints are provided on the engine/exhaust system casings to achieve radial constraint and circumferential positioning of the band clamp apparatus.

6 Claims, 3 Drawing Sheets

BAND CLAMP APPARATUS STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to jet engines, and in particular to a band clamp apparatus to allow an engine change without removal of the exhaust system.

The state of the art of engine band clamps is well represented and illustrated to some degree by the prior art apparatus and approaches which are presented by the following U.S. Patents:

U.S. Pat. No. 2,720,079 issued to Mines on Oct. 11 1955;

U.S. Pat. No. 2,773,709 issued to Smith on Dec. 11 1956;

U.S. Pat. No. 2,839,894 issued to Shutts et al on June 24 1958;

U.S. Pat. No. 3,903,693 issued to Fox on Sept. 9 1975; and

U.S. Pat. No. 4,480,436 issued to Maclin on Nov. 6 1984.

The Mines patent describes a clamp which is fashioned in several parts of different materials whereby a pair of conduits of one material may be clamped together by a clamp of different materials which will expand and contract substantially equally with the conduits during changes in temperature thereby resulting in a uniformly tight joint at all times.

The Smith patent is directed to a bimetallic clamp which has indentations on the inner face of the band in each of which the free legs of one or a pair of bimetallic means or retainers rest, the indentation acting as a stop to limit retraction of the retainers under temperature change and to give the necessary pressure on the flanges with a smaller change in band diameter.

The Shutts et al patent discloses a gas turbine combustion chamber which utilizes a split-ring clamp that is bolted together, to secure a flanged end cover to the complementary flanged end of the air jacket of the combustion chamber.

The Fox patent discusses a rocket motor housing in which a trailing segment or nozzle is attached to a leading segment by an annular retaining ring. The ring comprises a central hoop segment with a pair of radially inwardly directed flanges. A pair of outwardly extending flanges on the ring receive a locking screw. A gasket ring is also shown in the Fox patent.

The Maclin patent shows a gas turbine engine construction which includes a turbine nozzle stage that is connected to the outlet of a combustion zone by bolts. The bolts pass through abutting flanges on a frame and the nozzle stage.

The designers of modern high performance aircraft require that the contours of exhaust nozzles blend well with the aircraft for low afterbody drag and high performance. In addition, the exhaust system which may include jet deflection for flight maneuver and thrust reversal capability as well as nozzle area variation, is increasingly being integrated into the aircraft structure. Both common use of structural members by the aircraft and engine exhaust system results in a lower overall aircraft system weight when compared to a conventional design wherein engine and aircraft have entirely independent structural members. Further trends toward exhaust system integration arises from the extension of the exhaust system function from the conventional engine exhaust area variation to flight maneuver and reversing as required on advanced aircraft. These requirements demand that exhaust control and actuation be accomplished directly from the aircraft, and be essentially independent of the engine control system.

The needs of low drag contouring and structural sharing by the aircraft and the exhaust system when combined with aircraft control of flight maneuver functions of the exhaust systems, results in an exhaust system which is generally difficult and time consuming to remove during engine maintenance. This fact together with the concurrent emphasis on very quick engine replacement as assurance that aircraft may be operational near full time, dictates that the propulsion system include a new means of attaching the engine to the exhaust system. The conventional bolted flange not only requires far too much maintenance time due to the number of bolts involved (50 to 100 bolts) but when installed, the only bolts that are accessible, are those on the bottom of the engine. There are no access doors on top of typical aircraft.

However, the nature of the loading at the engine-exhaust system interface poses a number of difficult problems in designing a quick maintenance clamp for attaching engine and exhaust system.

1. The pressure load tending to separate the joint is very high.

2. The separating loads are often non uniform, circumferentially, due to the close proximity of the engine mount and also to bending moments which result from flight maneuvers. This effect is particularly severe for any band clamp since a local high load can, due to local rolling or twisting of the flanges, cause the band to be displaced radially outward with risk of disengagement.

3. High shear load is applied due to aircraft maneuvers.

4. High torque must be transmitted across the joint to the engine mount should an inadvertent hard rub or seizure condition occur in the rotating machinery.

5. On rapid engine start or burst conditions the flanges will be higher in temperature than any external clamping band. Consequent thermal straining of the band may well be plastic and can result in loosening of the joint or rupture of the band.

6. Very high reliability of the clamping means is required since failure can result in not only power loss but severe damage to the aircraft and engine.

7. Replacement of engine in the field must be simple and quick with access only from the bottom.

The only type of joining means which meets the maintenance turn around time requirement is a band type clamp since few bolts are required and a band clamp is consistent with the limited, bottom only, access.

The well known conventional V-band clamp will solve item 7 very well, is in fair agreement with items 1 and 3 and can handle item 4 of torque provisions are added.

The critical items 2, 5 and 6 however, are not satisfied at all by the prior art conventional V-band clamp.

The previous prior art attempts to solve the problem had focused on the simplicity and maintenance advantages of the conventional V-band clamp which were used in attaching exhaust duct to aircraft engines. These results have been generally unsatisfactory and these clamp devices are no longer used on high temperature engine duct connections. The typical difficulties that were experienced are an exhaust nozzle lost in flight on IA engine and more recently a helicopter exhaust pipe lost in flight.

The conventional V-band clamp has the following limitations:

(1) it depends on high band tension to hold joint together. This is intolerant of any temperature difference between the flanges and the band since the highly stretched band may yield plasticly if the flange temperature exceeds the band temperature, thus resulting in a loosening or rupture of the band;

(2) it's reliability is inherently questionable since the integrity of the engine/aircraft system depends on a single, lonesome bolt; and (3) the risk of failure of this single high stressed bolt is compounded by the fact that it may not be firmly seated and must be tensioned by a mechanical style turnbuckle. A better band clamp is needed for reliable engine to exhaust system quick maintenance connection. Therefore, it is quite clear that a means is needed to quickly disconnect the engine from the exhaust system with access only from the bottom and to then quickly connect a replacement engine to the exhaust system.

SUMMARY OF THE INVENTION

The present invention utilizes a band clamp for a turbine engine, such as the GE 37 engine, which is used to attach the engine to the exhaust system. The clamp makes it possible to integrate the exhaust system into the aircraft geometry while at the same time providing accessibility for ease of maintenance and quick engine change. It comprises a simple two piece band type clamp which are connected on opposite sides at the horizontal centerline. The casing flange includes a rabbet with grooves that engage lugs on opposite engine casings. In addition the band clamp engages radial displacement constraining stops attached to the casings. Weight savings is achieved by using a scalloped band contour. Pins which are mounted on the casings engage recesses in the band connecting flange faces to provide both radial and circumferential constraint of the band clamp.

It is one object of the present invention, therefore, to provide an improved band clamp apparatus to attach a turbine engine to its exhaust system.

It is another object of the invention to provide an improved band clamp apparatus which integrates the exhaust system into the aircraft geometry.

It is still another object of the invention to provide an improved band clamp apparatus wherein greater accessibility is achieved for ease of maintenance and quick engine change.

It is an even further object of the invention to provide an improved band clamp apparatus which comprises a simple two piece band type clamp that is fastened together on opposite sides at the horizontal centerline.

It is still a further object of the invention to provide an improved band clamp apparatus wherein the clamp includes a rabbet with grooves that engage lugs on opposite casings.

It is yet another object of the invention to provide an improved band clamp apparatus wherein a scalloped band contour is utilized to achieve weight-savings.

It is even a further object of the invention to provide an improved band clamp apparatus wherein recesses in the band connecting flange faces engage casing pins to provide both radial and circumferential constraint.

These and other advantages, objects and features of the invention will become more apparent after considering the following description taken in conjunction with the illustrative embodiment in the accompanying drawings.

BRIEF DESCRIPTION OF THE DRAWINGS

FIG. 1a is a front view of an engine and its exhaust nozzle;

FIG. 1b is an end view of the engine of FIG. 1a;

FIG. 3a is an enlarged view of segment A of FIG. 2a;

FIG. 4b is a partial front view of the alternate embodiment of FIG. 4a; and

DESCRIPTION OF THE PREFERRED EMBODIMENT

Figures 1A, 1B:
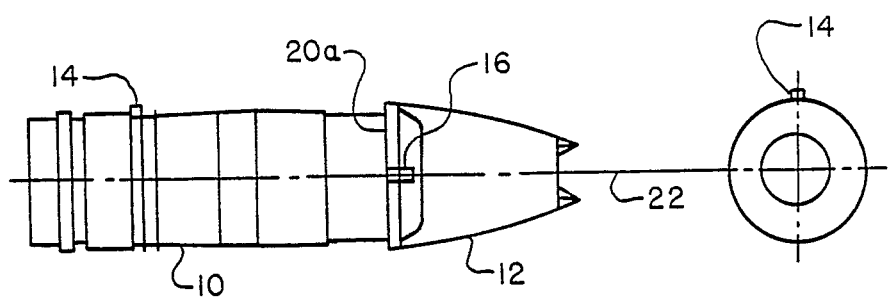

Referring now to FIGS. 1a and 1b there is shown respectively the front and end views of the band clamp apparatus which is utilized to join a turbine engine 10 to its exhaust system 12. The vertical mount 14 for the turbine engine is located substantially as shown. The exhaust system incorporates thrust mounts 16 which are located at the assembly centerline and are positioned on both sides of the exhaust system.

Figures 2A, 2B:
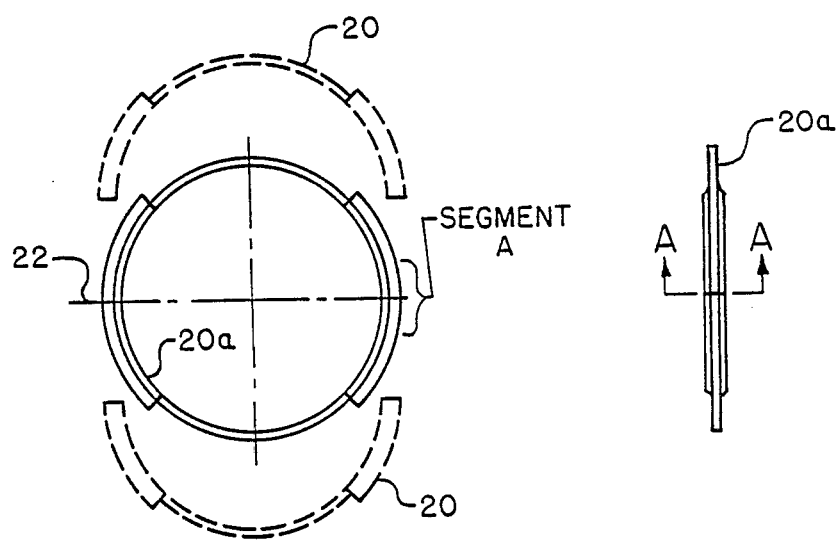
FIGS. 2a and 2b are end and front views respectively of the band clamp apparatus.

Turning now to FIGS. 2a and 2b, there is shown respectively end and front views of the band clamp apparatus. In FIG. 2a it may be seen that the band clamp apparatus comprises two 180° band segments 20 which are shown in phantom in the disassembled mode. When the band segments are bolted together at the horizontal centerline 22, the band clamp apparatus 20a is shown in its operative mode. In FIG. 2b, the band clamp apparatus 20a is shown as it would be positioned on the engine/exhaust system of FIG. 1a.

Figure 3A:
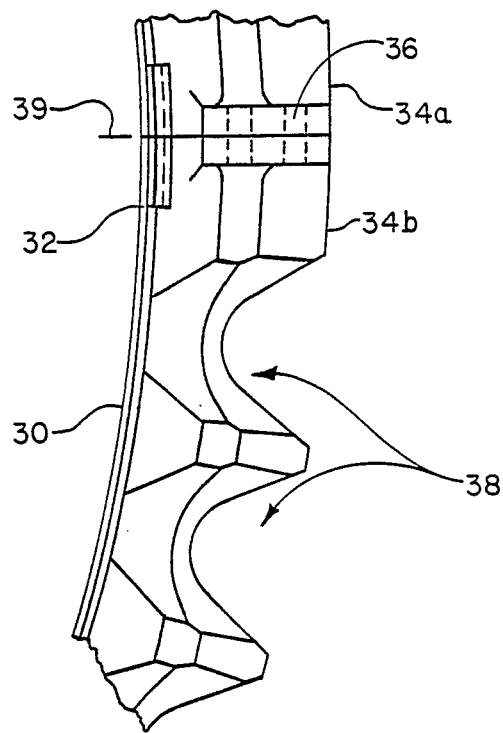

There is shown in FIG. 3a an enlarged view of the segment A of FIG. 2a. The engine casing 30 includes a local radial restraint 32 which engages both 180° segments 34 a,b of the band clamp apparatus. There is provided in one of the 180° clamp segments 34a, jackscrew holes 36 which will facilitate the separation of the segments during a maintenance repair procedure. In order to reduce the weight of the band clamp apparatus, there are included scallops 38 to reduce weight without losing structural integrity. The horizontal centerline 39 occurs at the horizontal centerline of the engine/exhaust system.

Figure 3B:
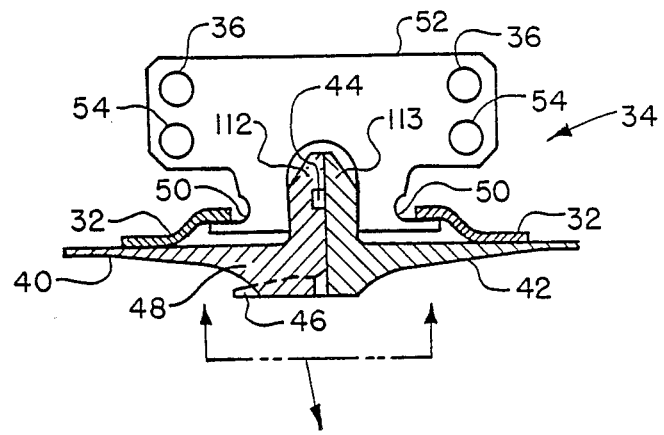
FIG. 3b is a sectional view of FIG. 2b taken along the section line AA.
Figure 3C:
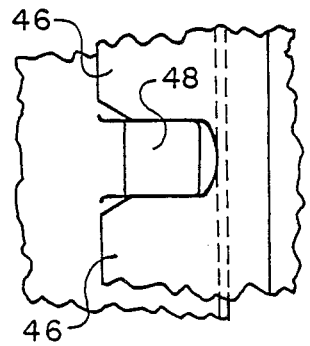
FIG. 3c is a sectional view of FIGS. 3b taken along section line BB.

In FIG. 3b there is shown a sectional view of the band clamp apparatus taken along section line A—A of FIG. 2b. There is shown in greater detail the mating of the flange surfaces of the engine 40 and the exhaust system 42. A groove 44 may be provided in either flange surface to permit the inclusion of a sealing O-ring. A lead-in rabbet 46 is provided to facilitate the mating of the flange surfaces. A lug 48 is provided to transmit torque between the casings during operation. This lug 48 is better shown in FIG. 3c. Torque transmission is addressed by the grooves in the rabbet 46 which engage lugs 48 on opposite engine casing 40 to transmit torque across the joint to the engine mount in the event of hard rubs or seizure of the turbo machinery. The band clamp 34 in FIG. 3b clearly shows the extension shoulders 50 which engage the local radial restraints 32. The mating flanges 52 of the band clamp apparatus includes jackscrew holes 36 and bolt holes 54 to receive the joint bolts (not shown). Shear loading is addressed as shown in FIG. 3b. In the absence of conventional flange bolts and due to the large diameter relative to flange section rigidity, a rigid rabbet 46 is used so that flanges are positively positioned under shear loading. The rabbet has a generous lead-in for easy assembly.

A non-uniform line load occurs because of close proximity to the thrust mount. This is a concern with any band clamp, especially the V-band type, since a local high line load can, due to cam action, result in a tendency to disengage locally. To prevent this, the band clamp engages radial displacement constraining stops 32 which are attached to the casings 40 and 42 adjacent to the high loaded mount area on the horizontal centerline.

Since both flanges 112 and 113, and clamp 52 must be designed for local high load conditions, weight may be saved by using a reduced band clamp section 20b in the lower loaded areas as shown in FIG. 2a.

Figure 4A:
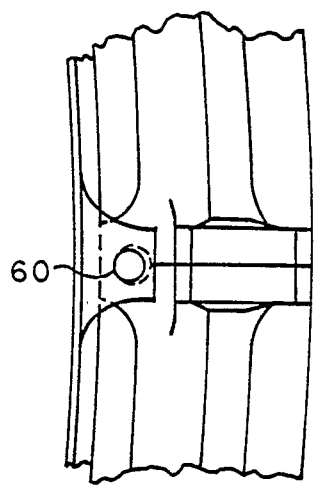
FIG. 4a is a partial end view of an alternate embodiment of a clamp displacement constraint.
Figure 4B:
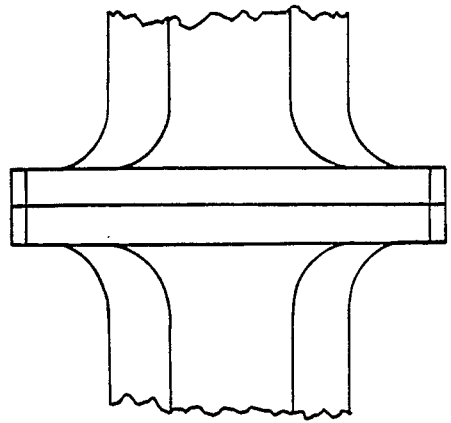
Figure 4C:
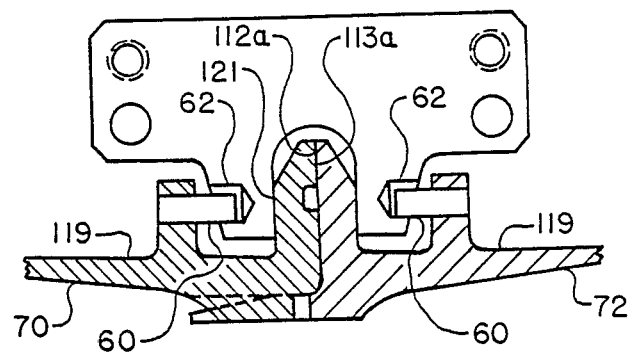
FIG. 4c is a sectional view 4 of FIG. 4b taken along section line CC.

Turning now to FIGS. 4a, 4b, and 4c there is shown an end, front and sectional view respectively of an alternate embodiment of the band clamp apparatus. The alternative embodiment utilizes a pin type limit stop 60 that engage recesses 62 in the band clamp flange face. In FIG. 4c which is a sectional view of FIG. 4b taken along the section line C—C, there is shown in greater detail, the pin stop 60 and the recess 62. This embodiment shows a means of providing the required local radial restraint which has the additional benefit of positive circumferential positioning of the band clamp as installed. Pins 60 which are mounted on the casings 70 and 72 engage recesses 62 in the band connecting flange faces and thus provide both radial and circumferential constraint of the band clamp.

On rapid start or throttle burst, the flanges which could be significantly higher in temperature than the band clamp are subject to thermal expansion. The parallel faces of flanges 112a, 113a allow for such expansion. There is thus no danger of overloading the band clamp fasteners. Flange roll deflection or twisting must also be considered. Since this deflection is greater than with a bolted flange, extra large hubs 119, are required to avoid excessive rolling and flexure stress at flange to casing joints 70 and 72. Under cuts 121, in the band clamp positively position the clamp to flange force close to the casing so that stress and deflections can be minimized and accurately determined.

Sealing is achieved by a conventional elastomer O-ring 44 that is used for effective leakage control, resistance to damage at assembly, easy retention in groove, easy replacement and low cost. The seal 44 is located radially outward in the flanges to minimize heat conduction from the fan air flowing in the engine ducts.

The reliability of the band clamp apparatus is enchanced by the following features:

(1) the clamp is not dependent on a single fastener as do conventional V-band clamps. Two bolts are used at each joint for redundancy;

(2) there is no band stress due to relative thermal expansion in view of parallel flange faces; and (3) the flanges are held together by the strength of the clamp section rather than band tension.

The ease of maintainability is achieved as follows:

(1) bolts are seated against flange (17) for simple maintenance procedures;

(2) there is no bolt torque requirement (unlike conventional V-band clamps);

(3) the seal is easily replaceable;

(4) a generous rabbet lead-in is provided for easy engagement of engine and exhaust system; and (5) threaded holes provided in one of the two flanges allow the use of bolts to apply force in separating the band clamp half rings.

Such a band clamp necessarily weighs more than a conventional bolted flange however; the weight is minimized by use of scalloped contouring of the band. These scallops do not compromise the structural integrity of the clamp but rather improve its structural efficiency so that the material is used more efficiently in carrying the clamping forces.

The band clamp here described will reliably join a turbojet engine and its exhaust system and will allow quick change of the engine when installed in a modern high performance aircraft without need to remove the exhaust system.

The following is a summary of the advantages and new features:

(1) Basically different than conventional V-band clamps because:
  (a) Two half bands bolted together with two bolts per joint for reliability and the bolts not loaded in operation;
  (b) the bolts are seated, therefore no adjustment is required;
  (c) the parallel flange faces allow for thermal expansion; and
  (d) a forcing screw provided for disassembly of clamp.

(2) for non uniform circumferential loading, radial displacement tendency and disengagement of band at high load points prevented by limit stops. Also, such stops located at band connection joints for assembly convenience;

(3) pin type limit stops engaging recesses in clamp flange faces perform dual function: Radial constraint and Circumferential positioning;

(4) contoured shear rabbet serves as assembly pilot;

(5) toothed shear rabbet engages opposite casing for circumferential positioning and torque transmission; and, (6) scalloped band contour for least weight.

Although the invention has been described with reference to a particular embodiment, it will be understood to those skilled in the art that the invention is capable of a variety of alternative embodiments within the spirit and scope of the appended claims.

What is claimed is:

1. A band clamp apparatus for an engine/exhaust system comprising in combination:

a first band clamp segment formed in a semi-circular shape, said first band clamp segment having a first flange at one end of said first band clamp segment and a second flange at the other end of said first band clamp segment, said first flange having a first and second bolt hole therein arranged on opposite sides of said first band clamp segment, said first flange having a pair of jackscrew holes therein arranged on opposite sides of said first band clamp segment, aligned with and spaced-above said first and second bolt holes respectively, said second flange having a third and fourth bolt hole therein arranged on opposite sides of said first band clamp segment, said first band clamp segment including a longitudinal groove in its inner surface extending the entire length thereof, said longitudinal groove forming a pair of substantially parallel wall surfaces, and, a second band clamp segment formed in a semi-circular shape, said second band clamp segment having a third flange at one end of said second band clamp segment and a fourth flange at the other end of said second band clamp segment, said third flange having a first and second bolt hole therein arranged on opposite sides of said second band clamp segment, said third flange having a pair of jackscrew holes therein arranged on opposite sides of said second band clamp segment, aligned with and spaced-above said first and second bolt holes respectively, said fourth flange having a third and fourth bolt hole therein arranged on opposite sides of said second band clamp segment, said second band clamp segment including a longitudinal groove in its inner surface extending the entire length thereof, said longitudinal groove forming a pair of substantially parallel wall surfaces, said engine/exhaust system providing a circumferentially mated jointed flange at their connecting point, said first and second band clamp segments positioned around said engine/exhaust system and operatively engaging said circumferentially-mounted flange, said first flange of said first band clamp segment operatively mating with said fourth flange of said second band clamp segment at the horizontal centerline of said engine/exhaust system, said first and fourth flanges being secured together by a pair of bolts, said second flange of said first band clamp segment operatively mating with said third flange of said second band clamp segment at the horizontal centerline of said engine/exhaust system, said second and third flanges being secured together by a pair of bolts.

2. A band clamp apparatus as described in claim 1 wherein a predetermined portion of the mid-section of said first and second band clamp segments is formed with a scalloped band contour to reduce weight.

3. A band clamp apparatus as described in claim 1 wherein shoulder extensions are provided at the flanged ends of said first and second band clamp segments to engage local radial restraints on the respective casings of said engine/exhaust system.

4. A band clamp apparatus as described in claim 1 wherein pin type limit stops on the respective casings of said engine/exhaust system engage recesses in the flange faces of said first and second band clamp segments.

5. A band clamp apparatus as described in claim 1 wherein forcing screws are accepted in said jackscrew holes to facilitate the separation of said first and second band clamp segments.

6. A band clamp apparatus as described in claim 1 wherein said pairs of bolts which fasten said first and second band clamp segments together, are not loaded during the operation of said engine/exhaust system.

* * * * *